US008657378B2

(12) United States Patent
Kunert et al.

(10) Patent No.: US 8,657,378 B2
(45) Date of Patent: Feb. 25, 2014

(54) SEAT ASSEMBLY HAVING AN ADJUSTABLE HEAD RESTRAINT ASSEMBLY

(75) Inventors: Frank Kunert, Ingolstadt (DE);
Michael Menges, Pliening (DE);
Karsten Mueller, Ingolstadt (DE);
Bernd Rolf Schwerma, Neuberg (DE)

(73) Assignee: Lear Corporation, Southfield, MI (US)

( * ) Notice: Subject to any disclaimer, the term of this patent is extended or adjusted under 35 U.S.C. 154(b) by 40 days.

(21) Appl. No.: 13/224,784

(22) Filed: Sep. 2, 2011

(65) Prior Publication Data
US 2012/0080923 A1 Apr. 5, 2012

Related U.S. Application Data

(60) Provisional application No. 61/389,410, filed on Oct. 4, 2010.

(30) Foreign Application Priority Data

Dec. 8, 2010 (DE) .......................... 10 2010 062 575

(51) Int. Cl.
*A47C 7/38* (2006.01)

(52) U.S. Cl.
USPC .......................................... 297/391; 297/409

(58) Field of Classification Search
USPC ................................................ 297/409, 391
See application file for complete search history.

(56) References Cited

U.S. PATENT DOCUMENTS

| | | | |
|---|---|---|---|
| 3,853,350 A * | 12/1974 | Leffler | 297/404 |
| 4,265,482 A | 5/1981 | Nishimura et al. | |
| 4,637,655 A * | 1/1987 | Fourrey et al. | 297/410 |
| 4,674,797 A | 6/1987 | Tateyama | |
| 6,082,817 A | 7/2000 | Mueller | |
| 6,390,558 B2 | 5/2002 | Fischer et al. | |
| 6,688,697 B2 | 2/2004 | Baumann et al. | |
| 6,715,829 B2 | 4/2004 | Svantesson et al. | |
| 6,767,064 B2 | 7/2004 | Veine et al. | |
| 6,805,411 B2 | 10/2004 | Gramss et al. | |
| 6,899,395 B2 | 5/2005 | Yetukuri et al. | |
| 7,036,857 B2 * | 5/2006 | Ichino | 292/347 |
| 7,048,336 B2 | 5/2006 | Mawbey et al. | |
| 7,070,235 B2 | 7/2006 | Schilling et al. | |
| 7,073,863 B1 | 7/2006 | Low et al. | |
| 7,111,901 B2 | 9/2006 | Schlierf et al. | |
| 7,137,668 B2 | 11/2006 | Kreitler | |
| 7,195,313 B2 | 3/2007 | Hippel et al. | |
| 7,232,187 B1 | 6/2007 | Sundararajan et al. | |
| 7,798,570 B2 * | 9/2010 | Kwiecinski et al. | 297/216.12 |
| 7,871,129 B2 | 1/2011 | Boes et al. | |
| 2001/0028191 A1 | 10/2001 | Lance | |
| 2001/0040396 A1 | 11/2001 | Kreuels et al. | |

(Continued)

FOREIGN PATENT DOCUMENTS

DE 102004005695 A1 8/2004
DE 102005020276 B3 9/2006

(Continued)

*Primary Examiner* — David R Dunn
*Assistant Examiner* — Timothy J Brindley
(74) *Attorney, Agent, or Firm* — Brooks Kushman P.C.

(57) ABSTRACT

A seat assembly having a headrest disposed on a support post. The headrest has a front shell and a rear shell. The front shell and rear shell may be configured to move in unison such that the front shell moves a greater distance than the rear shell.

20 Claims, 7 Drawing Sheets

(56) References Cited

U.S. PATENT DOCUMENTS

| | | | |
|---|---|---|---|
| 2004/0195894 A1* | 10/2004 | Pal et al. | 297/406 |
| 2005/0077762 A1 | 4/2005 | Kraemer et al. | |
| 2005/0116515 A1 | 6/2005 | Schlierf et al. | |
| 2006/0071518 A1 | 4/2006 | Hippel et al. | |
| 2006/0226688 A1 | 10/2006 | Terada et al. | |
| 2007/0216211 A1 | 9/2007 | Mori | |
| 2009/0058162 A1 | 3/2009 | Boes et al. | |
| 2009/0146479 A1 | 6/2009 | Boes et al. | |
| 2010/0127541 A1* | 5/2010 | Kotz | 297/404 |
| 2010/0127548 A1* | 5/2010 | Truckenbrodt et al. | 297/391 |
| 2012/0126605 A1 | 5/2012 | Gross et al. | |

FOREIGN PATENT DOCUMENTS

| | | |
|---|---|---|
| DE | 102006015785 A1 | 10/2006 |
| DE | 102007048151 B3 | 1/2009 |
| DE | 102008060641 A1 | 6/2009 |
| EP | 1717099 A2 | 11/2006 |
| FR | 2852066 A1 | 9/2004 |
| GB | 2340744 A | 3/2000 |
| WO | 2004089688 A1 | 10/2004 |
| WO | 2007073034 A1 | 6/2007 |

\* cited by examiner

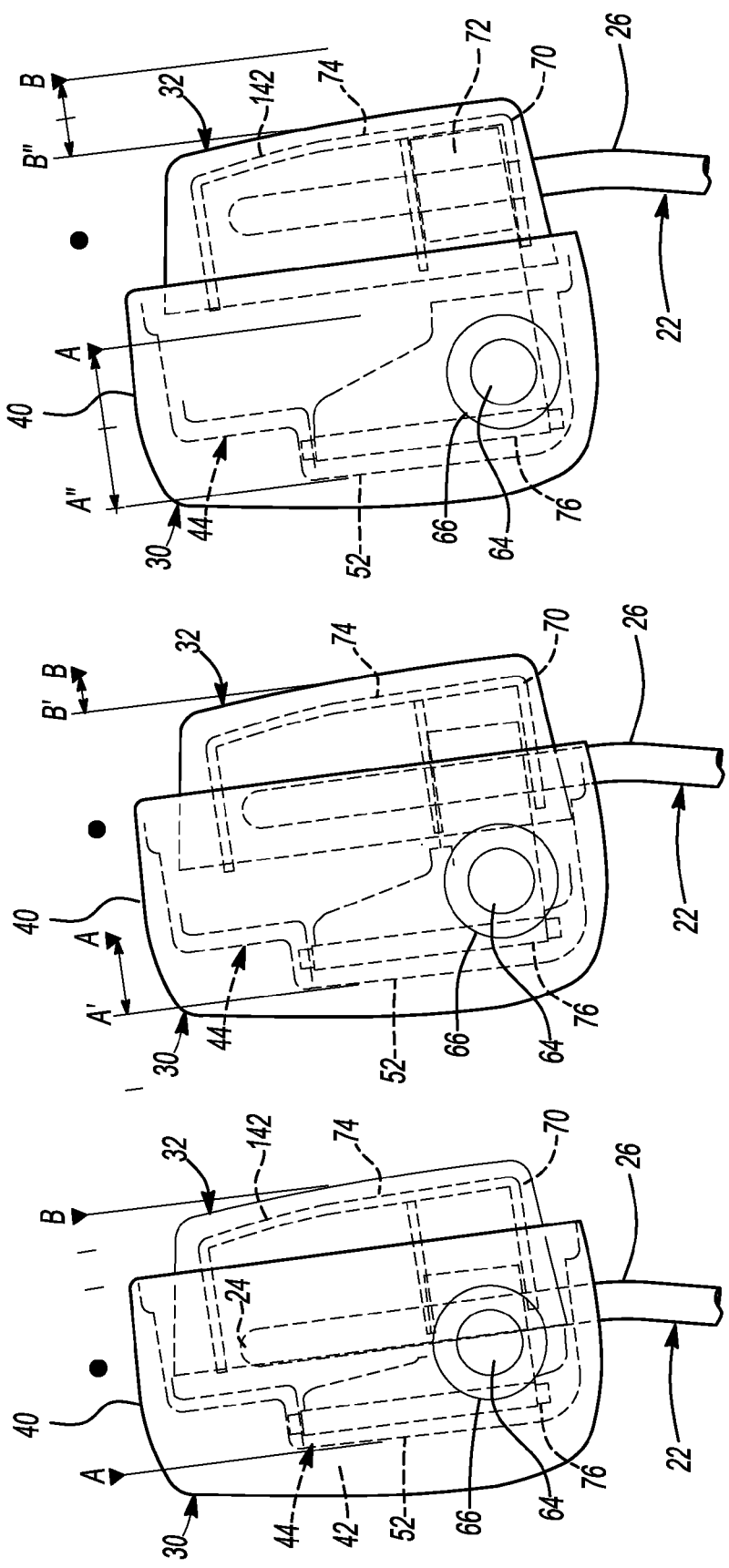

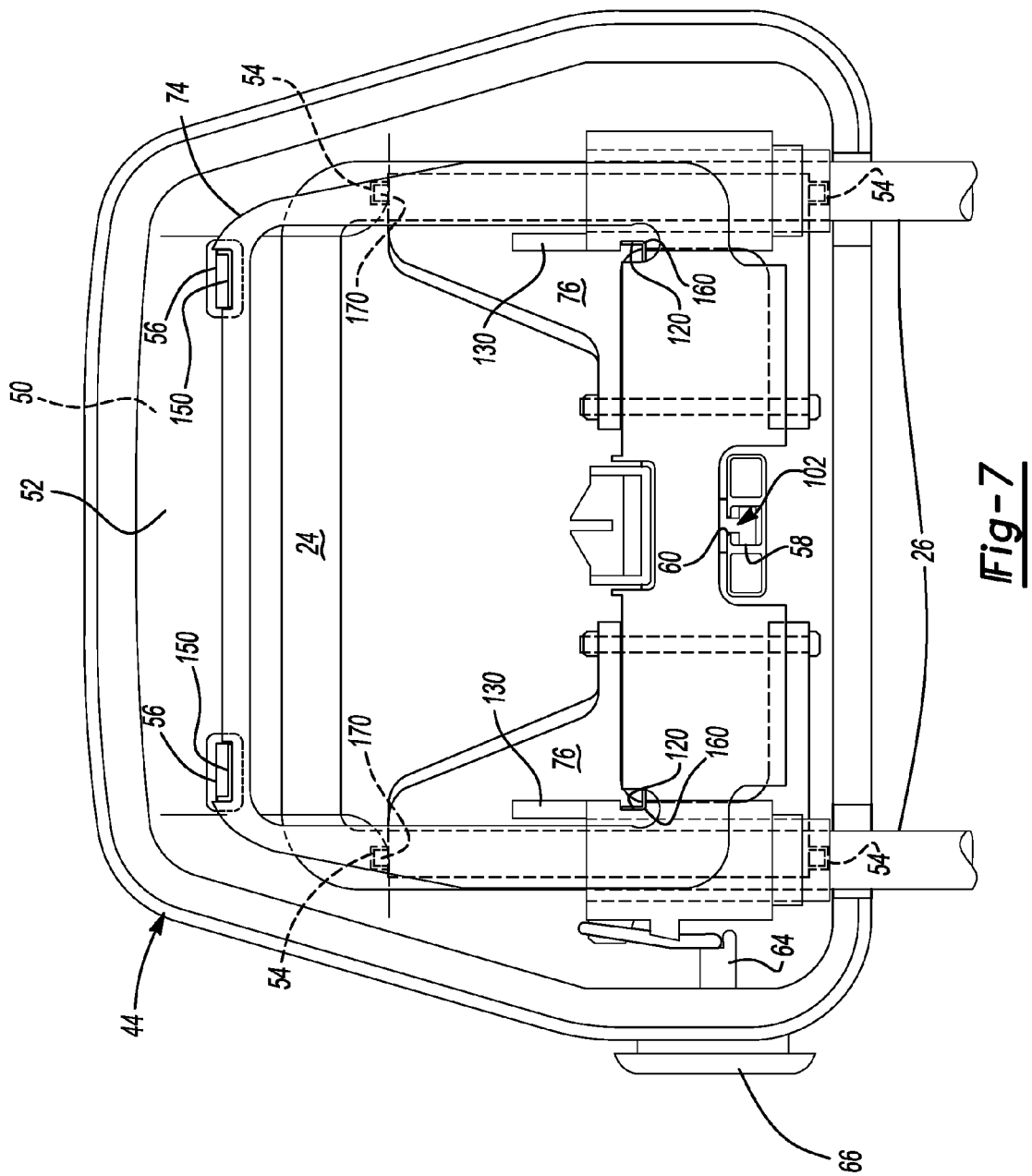

SEAT ASSEMBLY HAVING AN ADJUSTABLE HEAD RESTRAINT ASSEMBLY

CROSS-REFERENCE TO RELATED APPLICATIONS

This application claims the benefit of U.S. provisional application Ser. No. 61/389,410, filed Oct. 4, 2010 and claims foreign priority benefits under 35 U.S.C. §119(a)-(d) to DE 10 2010 062 575.2, filed Dec. 8, 2010, the disclosures of which are hereby incorporated by reference in their entirety.

BACKGROUND OF THE INVENTION

Field of the Invention

The present invention relates to a seat assembly having an adjustable head restraint assembly.

SUMMARY OF THE INVENTION

In at least one embodiment, a seat assembly is provided. The seat assembly may include a headrest disposed on the support post. The headrest may have a front shell and a rear shell. The front shell and rear shell may be configured to move in unison such that the front shell moves a greater distance than the rear shell.

In at least one embodiment, a seat assembly is provided. The seat assembly may have a head restraint assembly that includes a support post and a headrest moveably disposed on the support post. The headrest may have a front shell and a rear shell that are configured to move with respect to each other. A traverse member may be disposed in the headrest and may have an opening through which the support post extends. The support frame may be moveably disposed on the traverse member. The support frame may have a guide arm disposed above the support post that is received by the front shell for guiding movement of the front shell.

In at least one embodiment, a seat assembly is provided. The seat assembly may have a support post and headrest moveably disposed on the support post. A traverse member may be disposed in the headrest. The traverse member may include a hub and a block disposed proximate the hub. A support linkage may be rotatably disposed on the hub. The support linkage may have a mounting groove that receives the block. The support post may extend through the hub and the block may help retain the support linkage on the hub when the block is disposed in the mounting groove.

BRIEF DESCRIPTION OF THE DRAWINGS

FIG. 4 is a side view of the head restraint assembly disposed in the refracted position.

FIG. 5 is a side view of the head restraint assembly in an exemplary intermediate position.

FIG. 6 is a side view of the head restraint assembly in the extended position.

FIG. 7 is a back side view of a portion of the head restraint assembly.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
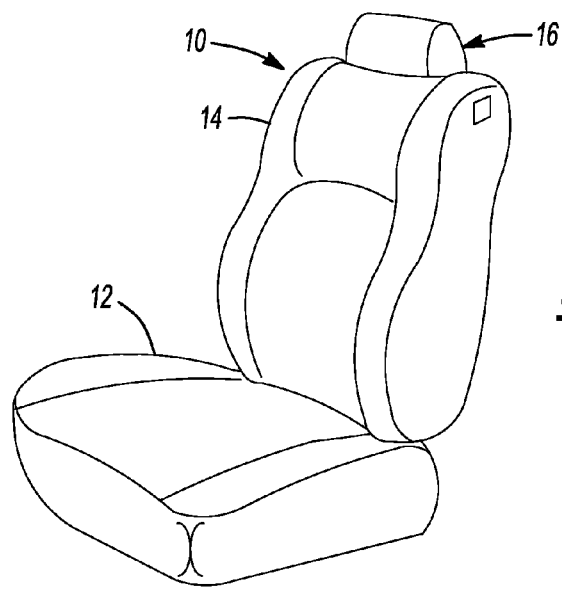
FIG. 1 is a perspective view of an exemplary seat assembly having a head restraint assembly.

Referring to FIG. 1, an exemplary seat assembly 10 is shown. The seat assembly 10 may be configured for use in a vehicle, such as a motor vehicle like a car or truck.

The seat assembly 10 may include a seat bottom 12 and a seat back 14. The seat bottom 12 may be configured to be mounted on a support surface, such as a floor pan of a vehicle. The seat back 14 may be pivotally disposed on the seat bottom 12 and may include a head restraint assembly 16.

Figure 2:
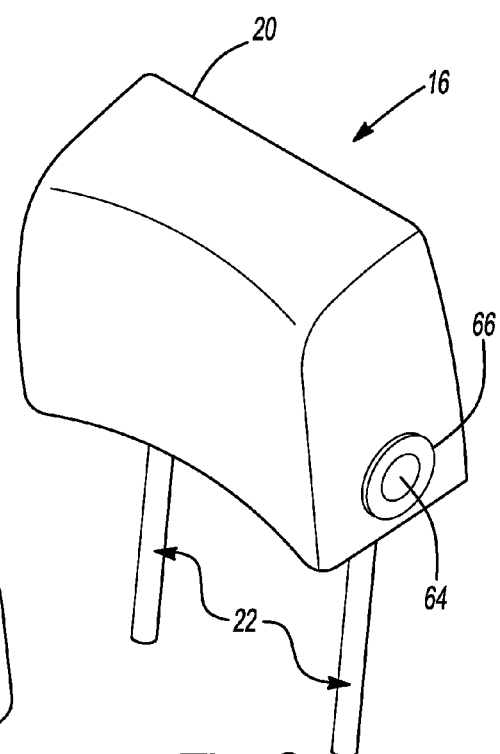
FIG. 2 is a perspective view of the head restraint assembly disposed in an exemplary retracted position.
Figure 3:
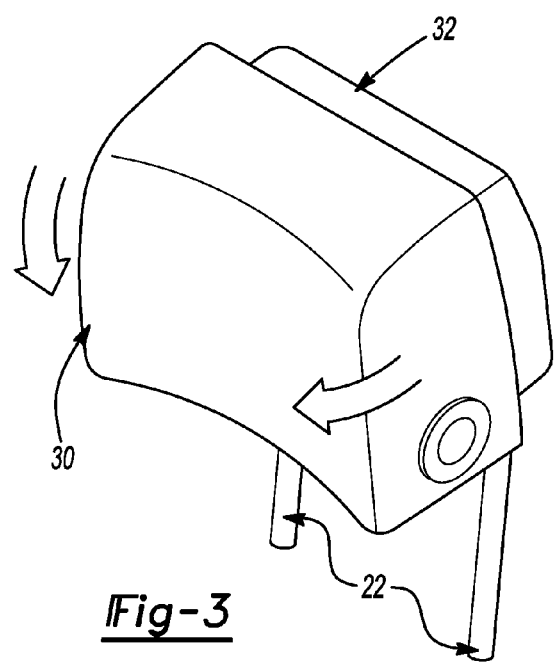
FIG. 3 is a perspective view of the head restraint assembly disposed in an exemplary extended position.

Referring to FIGS. 2-4, the head restraint assembly 16 may include a headrest 20 and one or more support posts 22. The headrest 20 may be moveably disposed on the support post 22 as will be described in more detail below. The support post 22 may be made of any suitable material or materials, such as a metal like an aluminum alloy.

The support post 22 may be configured to couple the headrest 20 to the seat back 14. The support post 22 may include and upper portion 24 and one or more lower portions 26. The upper and lower portions 24, 26 may be integrally formed and may cooperate to form a support post 22 having a generally U-shaped configuration in which the upper portion 24 extends between and connects a pair of lower portions 26 as is best shown in FIG. 7. As such, the upper portion 24 may help strengthen or provide structural reinforcement for the support post 22.

The lower portion 26 may have a linear or non-linear configuration. An exemplary non-linear configuration is shown in FIG. 4 in which the lower portion 26 is bent at an angle. An end of the lower portion 26, such as a region below the bend in the embodiment shown in FIG. 4, may extend through the top of the seat back 14 and may be fixedly mounted to a structural frame of the seat back 14 such that the support post 22 does not move with respect to the seat back 14.

Figure 12:
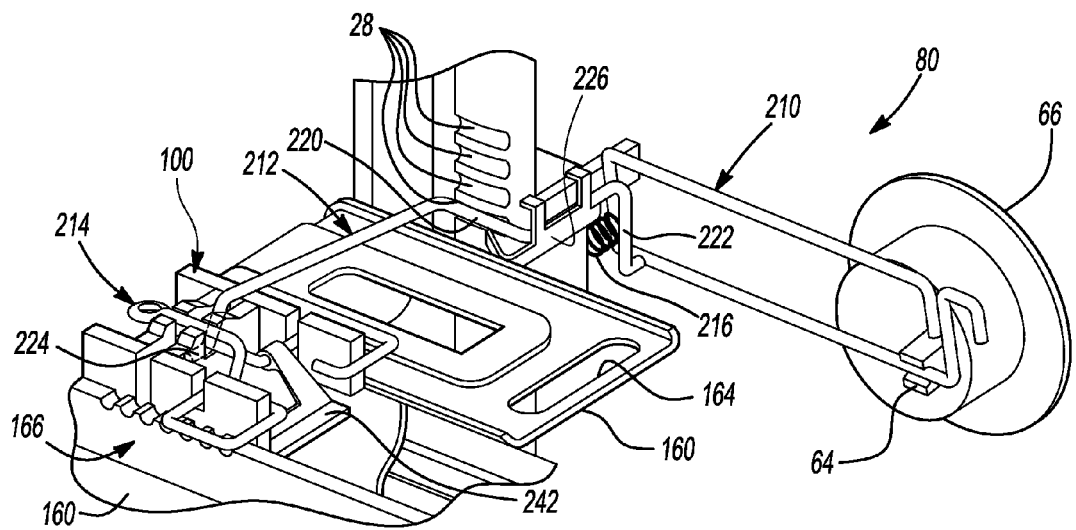
FIG. 12 is a fragmentary perspective view of a portion of the head restraint assembly showing a latch subsystem.

The support post 22 may include a plurality of notches 28. The notches 28, which are best shown in FIG. 12, may be spaced apart from each other and may provide predetermined positions at which the headrest 20 may be positioned along the support post 22. In at least one embodiment, the notches 28 may be provided on a region of the support post 22 that is disposed inside the headrest 20.

The headrest 20 may be configured to support the head of an occupant of the seat assembly 10. The headrest 20 may include a front portion 30 and a rear portion 32. The front portion 30 may be moveable with respect to the rear portion 32 as will be discussed in more detail below.

Referring to FIGS. 4-7, an exemplary front portion 30 is shown in more detail. The front portion 30 may be configured to engage or support the head of a seat occupant. The front portion 30 may include a trim cover 40, a cushion 42, and a front support shell 44. The trim cover 40 and cushion 42 are not shown in FIG. 7 for clarity.

The trim cover 40 may cover at least a portion of a visible exterior surface of the front portion 30 that may engage the head of a seat occupant. The trim cover 40 may be made of any suitable material or materials, such as a fabric, vinyl, leather, or the like. The trim cover 40 may be mounted on the front support shell 44. For instance, the trim cover 40 may generally wrap around one or more sides of the front support shell 44 and may be coupled thereto to provide a desired aesthetic appearance.

The cushion 42 may be disposed under at least a portion of the trim cover 40. As such, the cushion 42 may be disposed between trim cover 40 and the front support shell 44 such that a first surface of the cushion 42 may engage the trim cover 40 and a second surface disposed opposite the first surface may engage the front support shell 44. The cushion 42 may be made of any suitable material, such as foam.

The front support shell 44 may provide structural support for the front portion 30. The front support shell 44 may be made of any suitable material, such as a polymeric material that may be configured to flex. In at least one embodiment, the front support shell 44 may include a front side 50, a back side 52, a plurality of mounting features 54, an upper guide opening 56, and a lower guide opening 58.

The front side 50 may face toward the head of a seat occupant and may engage the cushion 42. The back side 52 may be disposed opposite the front side 50 and may face toward the rear portion 32. As is best shown in FIG. 7, one or more mounting features 54 may be provided on the back side 52 that engage internal components of the head restraint assembly 16 as will be discussed in more detail below. The mounting features 54 may have a male configuration, a female configuration, or combinations thereof. In the embodiment shown, four mounting features 54 are provided that are configured as holes in the front support shell 44. The mounting features 54 may be provided in pairs with each pair being positioned along an axis.

One or more upper guide openings 56 may be provided in the front support shell 44 to help guide movement of the front portion 30 with respect to the rear portion 32 as will be discussed in more detail below. In the embodiment shown, two upper guide openings 56 are provided near the top of the front support shell 44 that are spaced apart from each other. The upper guide openings 56 may extend from the back side 52 toward the front side 50 and may be arranged substantially parallel to each other in one or more embodiments.

One or more lower guide openings 58 may be disposed near the bottom of the front support shell 44. The lower guide opening 58 may also help guide movement of the front portion 30 and may extend substantially parallel to the upper guide openings 56. The lower guide opening 58 may include a slot 60 that may be disposed at the top of the lower guide opening 58. The slot 60 may be configured to receive an engagement feature that extends through the slot 60 and into the lower guide opening 58 as will be discussed in more detail below.

The front portion 30 may also include an input device, such as a button 64. The button 64 may extend at least partially through a hole in a side of the front portion 30. A bezel 66 may be provided that extends at least partially around the button 64 to facilitate mounting and help provide a desired aesthetic appearance. The button 64 may be part of a latch subsystem that will be described in more detail below.

Referring to FIGS. 4-6 and 8-10, the rear portion 32 and internal components of the head restraint assembly 16 are shown in more detail. The rear portion 32 may include a rear shell 70 that may cover at least a portion of its visible exterior surface. The rear shell 70 may have a bowl-like configuration that may at least partially define an opening that faces toward the front portion 30. Internal components that may be concealed by and/or disposed at least partially within the rear shell 70 may include a traverse member 72, a support frame 74, a pivot member 76, a support linkage 78, and a latch subsystem 80.

Figure 10:
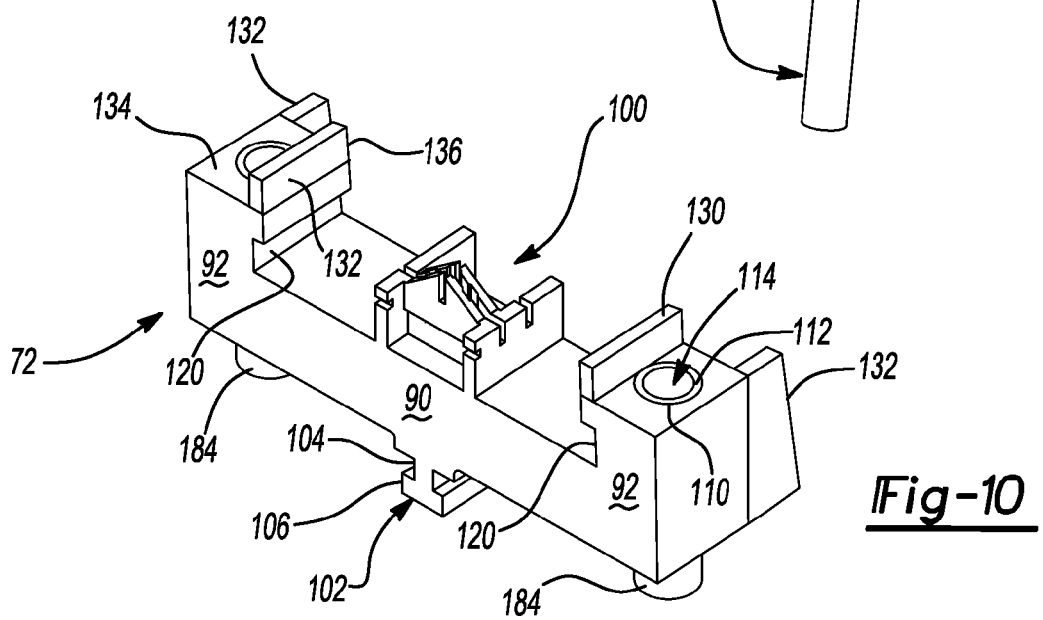
FIG. 10 is a perspective view of an exemplary traverse member.

Referring to FIG. 10, the traverse member 72 may be configured to move along the support post 22. In at least one embodiment, the traverse member 72 may include a center portion 90 and one or more guide blocks 92 disposed at opposite ends of the center portion 90. The traverse member 72 may be made of any suitable material, such as a polymeric material.

Figure 8:
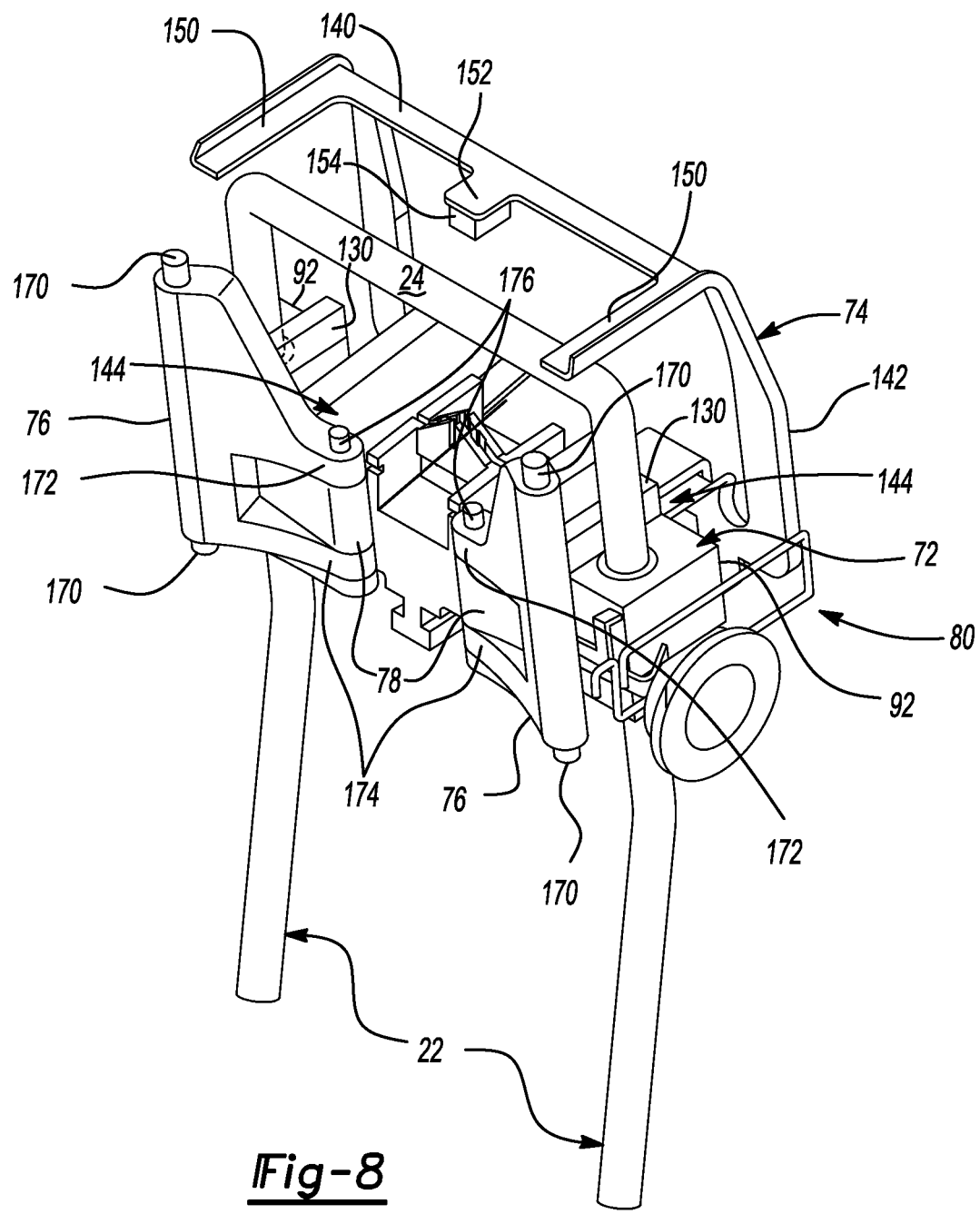
FIG. 8 is a fragmentary perspective view of the head restraint assembly disposed in the retracted position.
Figure 9:
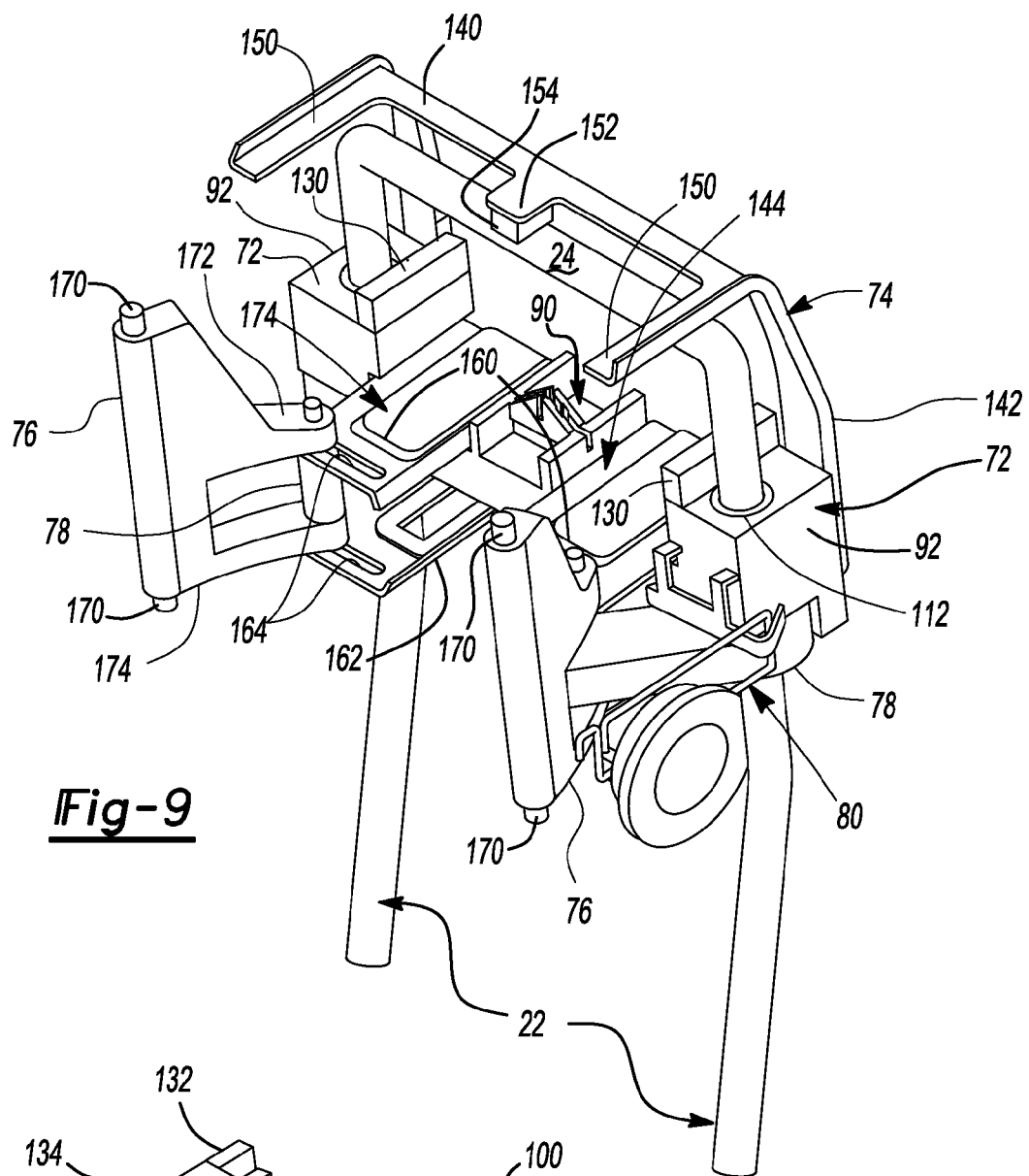
FIG. 9 is a fragmentary perspective view of the head restraint assembly disposed in the extended position.

Referring to FIGS. 8-10, the center portion 90 may be generally disposed below the upper portion 24 of the support post 22. The center portion 90 may include a latch mounting region 100 and a guide feature 102.

The latch mounting region 100 may facilitate mounting of at least a portion of the latch subsystem 80 as will be described in more detail below. In the embodiment shown, the latch mounting region 100 is generally disposed on a top surface of the center portion 90 proximate the middle of the center portion 90.

The guide feature 102 may help support and guide movement of the front portion 30 with respect to the traverse member 72. The guide feature 102 may extend from a bottom surface of the center portion 90. In the embodiment shown, the guide feature 102 is disposed directly below the latch mounting region 100. The guide feature 102 may be received in the lower guide opening 58 and may be configured to permit the front portion 30 to move toward or away from the traverse member 72 while helping constrain movement in other directions. In at least one embodiment, the guide feature 102 may have an inverted T-shaped configuration where a first portion 104 of the guide feature 102 extends downwardly through the slot 60 and a second portion 106 extends outwardly from the first portion 104. As such, the second portion 106 may engage a surface of the front support shell 44 that forms the lower guide opening 58 to permit the front support shell 44 to move in a fore-aft direction with respect to the traverse member 72, or generally toward or away from the head of a seat occupant, while inhibiting movement in one or more other directions. In at least one embodiment, the second portion 106 may be disposed substantially perpendicular to the first portion 104 and may be disposed substantially parallel to the center portion 90.

The guide blocks 92 may be integrally formed with the center portion 90. Each guide block 92 may include a hole 110 that extends through the guide block 92. One or more bushings 112 may be disposed in each hole 110. In at least one embodiment, each hole 110 may be provided with two bushings 112 that may be coaxially disposed. One bushing 112 may be positioned above the other bushing 112 to help inhibit pivoting of the traverse member 72 with respect to the support post 22. Each bushing 112 may have a bushing hole 114 for receiving the support post 22. The bushings 112 may have the same or different configurations. Examples of bushings that may be used are disclosed in German patent application serial number 10 2010 031 048 and PCT international application number PCT/US2010/037725, which are assigned to the assignee of the present application and are hereby incorporated by reference in their entirety.

The guide blocks 92 may also include a guide slot 120 that may receive and help guide movement of the support frame 74 with respect to the traverse member 72. The guide slot 120 may be provided on an exterior surface of the guide block 92 proximate the center portion 90. In the embodiment shown, the guide slots 120 face toward each other and extend along the top of the center potion 90 in a substantially parallel relationship between front and back surfaces of the traverse member 72. As such, the guide slot 120 may permit fore-aft movement of the support frame 74 with respect to the traverse member 72 while helping inhibit movement of the support frame 74 in one or more other directions.

The traverse member 72 may also include one or more vertical stops 130 and horizontal stops 132 that help limit the range of motion of the traverse member 72 with respect to the support post 22. The vertical stop 130 may extend from a top surface 134 of the guide block 92 or center portion 90 toward the upper portion 24 of the support post 22. Upward movement of the traverse member 72 may be inhibited when the vertical stop 130 engages the upper portion 24. The horizontal stop 132 may extend from a rear surface 136 of the guide block 92 or traverse member 72 toward the support frame 74. Forward movement of the support frame 74 may be inhibited with the horizontal stop 132 engages the support frame 74 and/or rear shell 70. Vertical and/or horizontal stops 130, 132 may be omitted in one or more embodiments. If provided, the vertical and horizontal stops 130, 132 may be integrally formed with the traverse member 72 or provided as separate components that may be assembled to the traverse member 72. By providing the vertical and/or horizontal stops 130, 132 as separate components, a standardized traverse member configuration may be employed while providing the option of providing one or more stops to provide a desired range of motion to accommodate design parameters and/or regulatory requirements.

Referring to FIGS. 8 and 9, the support frame 74 may be moveably disposed on the traverse member 72. The support frame 74 may be made of any suitable material, such as a metal like an aluminum alloy. The rear shell 70 may be fixedly mounted to the support frame 74. The support frame 74 may have any suitable configuration. In the embodiment shown, the support frame 74 includes a top portion 140, a back portion 142, and one or more sets of mounting arms 144.

The top portion 140 may be generally disposed at the top of the support frame 74. The top portion 140 may generally extend from a top end of the back portion 142 toward the front support shell 44. The top portion 140 may have one or more guide arms 150 and a bumper tab 152.

The guide arms 150 may guide relative movement of the front and rear portions 30, 32 and may help provide structural support for the headrest 20. In at least one embodiment, a pair of guide arms 150 may be provided that are spaced apart from each other and that each may be received by an upper guide opening 56 on the front support shell 44 as is best shown in FIG. 7. In addition, the guide arms 150 may extend substantially parallel to each other.

The bumper tab 152 may extend toward the front portion 30. In addition, the bumper tab 152 may be disposed between and may extend substantially parallel to the guide arms 150 in one or more embodiments. The bumper tab 152 may have a shorter length than the guide arms 150 such that it does not engage the front support shell 44 in one or more embodiments. A bumper 154 may be disposed on the bumper tab 152 for cushioning and/or limiting movement of headrest 20 along the support post 22. For instance, the bumper 154 may be provided on a bottom surface of the bumper tab 152 that faces toward the upper portion 24 of the support post 22 to inhibit the upper portion 24 from engaging or contacting the guide arms 150. In addition, the bumper 154 may be disposed above the upper portion 24 of the support post 22 throughout the range of fore-aft motion of the support frame 74 with respect to the traverse member 72. The bumper 154 may be made of any suitable material, such as a polymeric material or elastomeric material like rubber.

The back portion 142 may be located between the rear shell 70 and the support post 22. The bottom of the back portion 142 may be generally disposed rearward of the traverse member 72 in one or more embodiments. One or more openings may be provided in the back portion 142 to help reduce weight and/or material cost.

One or more sets of mounting arms 144 may be provided for moveably coupling the support frame 74 to the traverse member 72. In the embodiment shown, two sets of mounting arms 144 are provided that extend from the back portion 142 toward the front portion 30. Each set may include one or more arms, such as an upper arm 160 and a lower arm 162. In such an embodiment, the upper and lower arms 160, 162 may be spaced apart from each other and may extend substantially parallel to each other. The traverse member 72 may be disposed between the upper and lower arms 160, 162. As such, the upper and lower arms 160, 162 may facilitate mounting of the support frame 74 by capturing the traverse member 72 between the upper and lower arms 160, 162. In addition or alternatively, the upper arm 160, lower arm 162, and/or traverse member 72 may include one or more fasteners that may help couple the support frame 74 to the traverse member 72. Each upper arm 160 may be disposed in a corresponding guide slot 120 on the traverse member 72 and the latch mounting region 100 may be disposed between the upper arms 160.

The upper and lower arms 160, 162 may each have distal ends that include a slot 164. The slots 164 in the upper and lower arms 160, 162 may be similarly configured and may be aligned with each other. In addition, the slots 164 may have an elongated configuration such that the slots 164 may extend along a front edge of the upper and lower arms 160, 162 and may be disposed substantially parallel to the upper portion 24 of the support post 22. A bushing may be associated with one or more slots 164 to provide a bearing surface. The bushing may include an opening that has a similar configuration as an associated slot 164.

Figure 13:
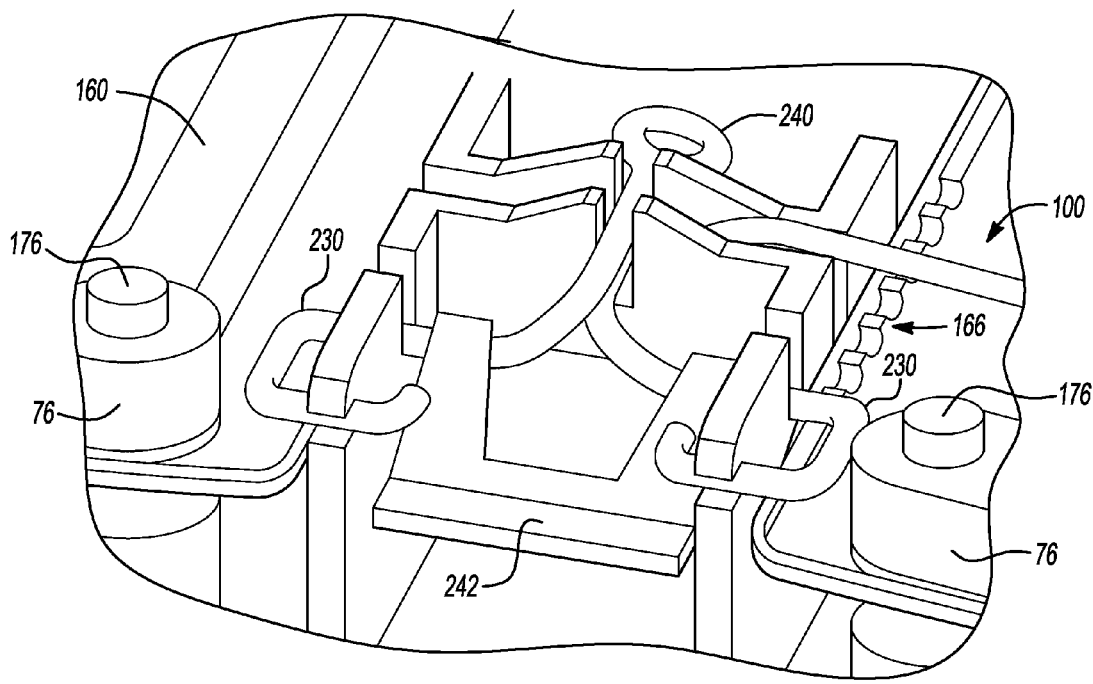
FIGS. 13 and 14 are magnified perspective views of a portion of the latch subsystem.

Referring to FIGS. 12 and 13, one or more arms may include a set of teeth 166. In the embodiment shown, the upper arms 160 each have a set of teeth 166 that extend along a side of each upper arm 160 that is disposed proximate the latch mounting region 100 of the traverse member 72. The set of teeth 166 may cooperate with the latch subsystem 80 to allow the front portion 30 to be secured in predetermined discrete positions.

Figure 11:
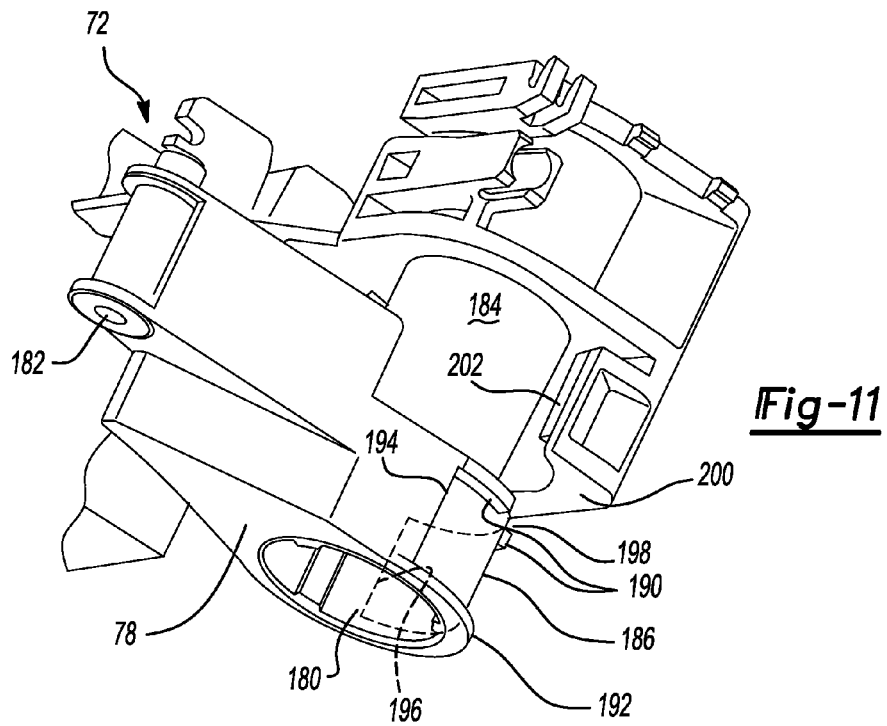
FIG. 11 is an exploded view showing a portion of the traverse member of FIG. 10 and a support linkage.

Referring to FIGS. 8, 9 and 11, one or more pivot members 76 may be provided that facilitate angular movement of the front portion 30. In the embodiment shown, two pivot members 76 are provided. The pivot members 76 may include one or more coupling features 170 that may engage the front portion 30. The coupling features 170 may have a male configuration, female configuration, or combinations thereof. In at least one embodiment, the coupling features 170 may be configured as pins that are received in the mounting features 54 on the front support shell 44. In addition, the pivot members 76 may include one or more mounting features, such as a first mounting feature 172 and a second mounting feature 174. The first and second mounting features 172, 174 may be spaced apart from each other and may each include a hole that may be coaxially disposed with each other. The holes may receive one or more fasteners, such as a pivot pin 176.

The support linkage 78 may be provided to help support and/or control movement of an associated pivot member 76. The support linkage 78 may include a first end having a first hole 180 and a second end disposed opposite the first end that has a second hole 182.

The first hole 180 may be disposed on a hub 184 that may be provided on the traverse member 72. The hub 184 may have an opening through which the support post 22 may extend. As such, the support linkage 78 may be configured to rotate about or with respect to the support post 22. Moreover, the support linkage 78 may transmit force between the pivot member 76 and the traverse member 72. The second end of the support linkage 78 may be disposed between the first and second mounting features 172, 174 of the pivot member 76 and may be configured to facilitate rotation with respect to the pivot pin 176.

The first end of the support linkage 78 may also include a mounting groove 186. The mounting groove 186 may be disposed along a portion of an exterior circumference of the support linkage 78 and may have an arcuate configuration. The mounting groove 186 may be bounded by upper and lower walls 190, 192 that may be spaced apart from each other and by first and second end walls 194, 196 that may be disposed at opposite ends of the mounting groove 186 and may extend from or between the upper and lower walls 190, 192.

The upper wall 190 may include an opening 198 that may facilitate assembly of the support linkage 78 to the traverse member 72. More specifically, the traverse member 72 may include a guide wall 200 that may extend partially around and may be spaced apart from the hub 184. The guide wall 200 may have a curvature that generally follows that of the hub 184. A block 202 may be disposed on the guide wall 200 and may extend toward and may be spaced apart from the hub 184. In at least one embodiment, the block 202 may be integrally formed with the guide wall 200 and may be configured to fit within the mounting groove 186.

The support linkage 78 may be installed on the hub 184 by aligning the block 202 with the opening 198 in the upper wall 190. The support linkage 78 may then be moved axially onto the hub 184 such that the hub 184 is inserted into the first hole 180 and the block 202 is inserted through the opening 198 in the upper wall 190. The support linkage 78 may then rotate about the hub 184 such that the block 202 may be disposed within the mounting groove 186. The block 202 may cooperate with the walls of the mounting groove 186 to guide and control movement of the support linkage 78. During normal operation, the block 202 may be rotated away from the opening 198 such that the block 202 may engage the upper and/or lower walls 190, 192, thereby inhibiting disengagement of the support linkage 78 from the hub 184. In addition, the block 202 and upper and lower walls 190, 192 may cooperate to transmit load forces. For instance, load forces imparted on the front portion 30 of the headrest 20 may be transmitted through pivot member 76 to the support linkage 78, which then may be transmitted to the traverse member 72 by engagement of the block 202 with the upper wall 190, lower wall 192 and/or the hub 184, and between the support linkage 78 and the hub 184.

The pivot pin 176 may couple the support frame 74, pivot member 76 and support linkage 78. For instance, the pivot pin 176 may extend through the slots 164 in the upper and lower arms 160, 162, holes in the first and second mounting features 172, 174, and the second holes 182 in the support linkage 78. The slots 164 may help constrain and guide movement of the pivot pin 176. For instance, the pivot pin 176 may slide within the slots 164 such that the pivot pin 176 is disposed near or at a first end of the slot 164 located near the center of the head restraint assembly 16 when in the retracted position as shown in FIG. 8. The pivot pin 176 may be disposed near a second end of the slot 164 that is disposed opposite the first end when in the extended position as shown in FIG. 9.

Figure 14:
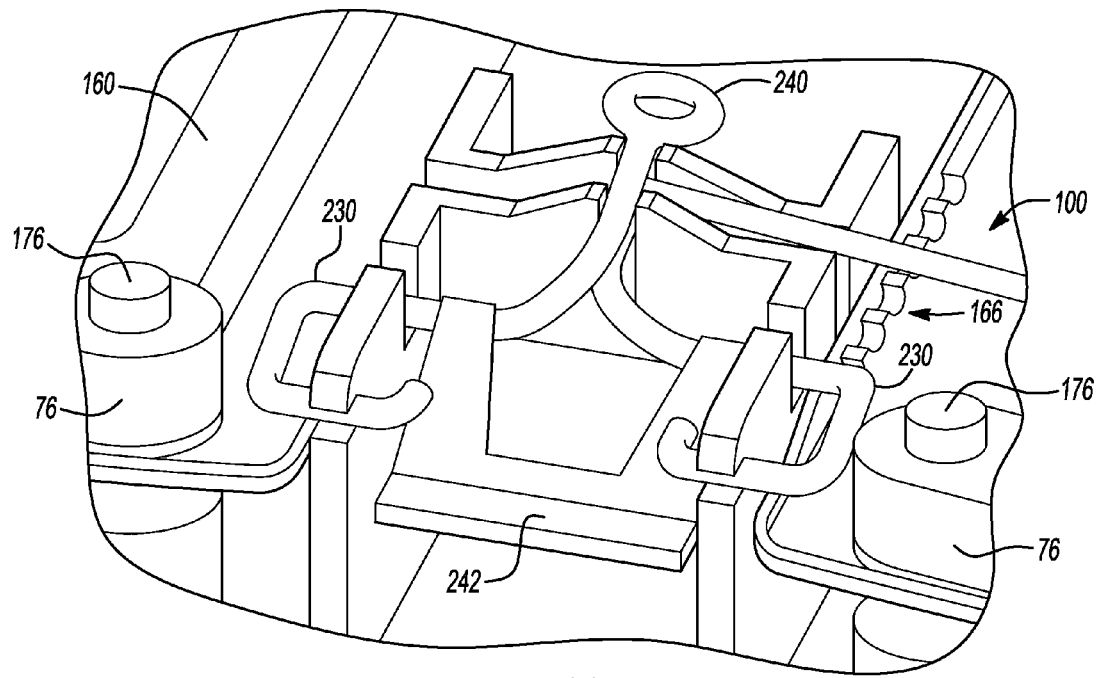

Referring to FIGS. 12-14, an embodiment of a latch subsystem 80 is shown. The latch subsystem 80 may be provided to help enable and disable movement of the head restraint assembly 16. More specifically, the latch subsystem 80 may move between a latched position in which movement of the head restraint assembly 16 is disabled and an unlatched position in which movement of the head restraint assembly 16 in one or more directions is enabled. In at least one embodiment, the latch subsystem 80 includes one or more coupling members, such as a first coupling member 210, a second coupling member 212, and a third coupling member 214. Alternatively, the latch subsystem 80 may be provided with a different mechanical linkage, such as one or more cables, or with an electrical or electromechanical actuator. For instance, an electrical machine, such as a motor or solenoid, may be provided that latches or actuates a latch to enable or disable movement of the head restraint assembly 16.

The first coupling member 210 may be moveably disposed on a portion of the head restraint assembly 16, such as the traverse member 72. In addition, the first coupling member 210 may engage or be coupled to the button 64. For example, the first coupling member 210 may be fastened to the button 64 and traverse member 72 in any suitable manner, such as with a fastener or snap fit into a slot in the button 64. The first coupling member 210 may have any suitable configuration. For example, the first coupling member 210 may be provided as a wire that is formed in a generally rectangular shape in one or more embodiments. A biasing member 216 may bias the first coupling member 210 and the button 64 outward toward an initial position or generally away from a support post 22 toward an exterior surface of the headrest 20. The biasing member 216, which may be configured as a spring, may have a first end that engages the first coupling member 210 and a second end that engages the traverse member 72.

The second coupling member 212 may be moveably associated with the first coupling member 210. In addition, the second coupling member 212 may be adapted to permit or inhibit movement of the head restraint assembly 16. For instance, the second coupling member 212 may include a support post engagement portion 220 that disables movement of the headrest 20 along the support post 22 when it engages a support post notch 28 and permits movement along the support post 22 when it does not engage a notch 28. The support post engagement portion 220 may be disposed between a first end 222 and a second end 224 of the second coupling member 212 disposed opposite the first end 222. The first end 222 may be configured to engage the first coupling member 210. The second end 224 may be configured to engage the third coupling member 214. As such, the second coupling member 212 may extend from the first coupling member 210 toward the latch mounting region 100 of the traverse member 72. In at least one embodiment, the second end 224 may be disposed at an angle relative to an adjacent portion of the second coupling member 212, such as at an angle that extends downward toward the traverse member 72.

The second coupling member 212 may be disposed on the head restraint assembly 16 in any suitable manner. For example, a fastener 226 may be provided that couples the second coupling member 212 to the traverse member 72. The fastener 226 may be provided as a clip and may permit the second coupling member 212 to slide along or within the fastener 226. In addition, the second coupling member 212 may engage or may be received by part of the latch mounting region 100 to help guide its movement.

The third coupling member 214 may be moveably associated with the second coupling member 212. In addition, the third coupling member 214 may be adapted to permit or inhibit movement of the head restraint assembly 16. For instance, the third coupling member 214 may include one or more tooth engagement portions 230 that may disable movement of the front portion 30 when it engages a member of the set of teeth 166 as shown in FIG. 13. Moreover, movement of the front portion 30 may be enabled when the third coupling member 214 is disengaged from a member of the set of teeth 166 as shown in FIG. 14. The third coupling member 214 may be made using a wire. The wire may have a square cross section to provide a greater contact surface or better engagement with members of the set of teeth 166 as compared to a wire having a round cross section.

The third coupling member 214 may have any suitable configuration. In the embodiment shown in FIGS. 12-14, the third coupling member 214 is generally wishbone-shaped and has an engagement portion 240 that may be configured to be engaged by the second coupling member 212. The engagement portion 240 may be received by or extend through one or more slots in the latch mounting region 100 to help position third coupling member 214. The third coupling member 214 may be generally symmetrically disposed about the engagement portion 240 and may be pivotally mounted on a portion of the head restraint assembly 16, such as the latch mounting region 100 of the traverse member 72. For example, the third coupling member 214 may be pivotally disposed or snap fit into one or more slots in the latch mounting region 100.

A spring 242 may be provided that exerts a biasing force on the third coupling member 214. The spring 242 may have any suitable configuration. The spring 242 may be disposed on the traverse member 72 and may bias the third coupling member 214 toward the set of teeth 166.

The head restraint assembly 16 may move with respect to the support post 22 in three general manners. First, the headrest 20 may move along the support post 22 generally up and down (e.g., away or toward the seat back 14) when the traverse member 72 moves along the support post 22. Second, the headrest 20 may move in a fore-aft direction that may be generally perpendicular to the up and down direction of movement when the support frame 74 moves across the traverse member 72. During fore-aft movement, both the front and rear portions 30, 32 may move generally toward or away from the head of a seat occupant. Third, the front portion 30 of the headrest 20 may flex or fold when it moves toward or away from traverse member 72. During such movement, the pivot members 76 may pivot and move lateral sides of the front portion 30 in an angular manner, such as by flexing or folding forward and inward toward the center of the front portion 30. The headrest 20 may move in one or more of these three general manners when the latch subsystem 80 is in the unlatched position and may be inhibited from moving in any manner when in the latched position. For instance, the front portion 30 may not flex in one or more embodiments.

Operation of the head restraint assembly 16 in accordance with at least one embodiment may be described as follows. To enable movement of the head restraint assembly 16 the button 64 may be actuated. Actuation of the button 64 may exert force on the first coupling member 210 and move the first coupling member 210 toward the second coupling member 212. Actuation of the second coupling member 212 may disengage the support post engagement portion 220 from the support post 22, thereby enabling vertical movement of the traverse member 72 along the support post 22. In addition, actuation of the second coupling member 212 may move the second end 224 toward the third coupling member 214 to exert force on the engagement portion 240. The third coupling member 214 may then disengage from the set of teeth 166 when sufficient force is provided to overcome the biasing force of the spring 242. The front and/or rear portions 30, 32 of the headrest 20 are then free to move with respect to the traverse member 72 in the fore-aft direction and/or by flexing or folding movement in the second and third manners described above.

The head restraint assembly 16 may simultaneously move in multiple directions when the latch subsystem 80 is in the unlatched position. Such movement may be in response to force exerted by a seat occupant. Optionally, movement may be aided by or in response to force exerted by an actuator, such as an electrical or electromechanical actuator such as a motor, solenoid, spring, linkage, or the like.

The front portion 30 and rear portion 32 of the headrest 20 may both move in the same direction when the headrest moves in a second manner (fore-aft direction) and/or a third manner (folding movement). Although the front and rear portions 30, 32 may move in the same direction, the distance of movement of the front portion 30 may differ from that of the rear portion 32. The different distances of movement may be expressed as a ratio. An exemplary ratio is illustrated by comparing FIGS. 4-6. In these figures the front portion 30 moves a greater distance than the rear portion 32 over a predetermined distance. A 2:1 ratio is illustrated in these figures in which the front portion 30 moves twice the distance as the rear portion 32 over a range of travel. The difference in the distance of relative movement may be due to actuation of the pivot members 76 and may be independent of the vertical position of the traverse member 72 along the support post 22.

In FIG. 4, the headrest 20 is shown in a fully retracted position in which the headrest 20 is moved as far rearward as possible. In this position, the back portion 142 of the support frame 74 may be disposed at a maximum distance from the support post 22 and the pivot members 76 may be retracted such that a front surface of the front portion 30 is at a point of minimum flexure or folding. Reference positions of the front and rear portions 30, 32 are designated by lines A and B, respectively.

In FIG. 5, the headrest 20 is shown after being moved forward to an intermediate position. The intermediate position shown may be representative of a position at the center of the range of travel. In this position, the front and rear portions 30, 32 have moved forward to positions designated by lines A' and B', respectively. The distance from line A to A' is shown as being twice the distance from line B to B'. For instance, the distance from line A to A' may be 30 mm while the distance from line B to B' may be 15 mm. The greater distance of travel of the front portion 30 may be due to movement of the pivot member 76.

In FIG. 6, the headrest 20 is shown after being moved to a fully advanced position in which the headrest 20 is moved as far forward as possible. In this position, the back portion 142 of the support frame 74 may be disposed at a minimum distance from the support post 22 and the pivot members 76 may be advanced such that a front surface of the front portion 30 is at a point of maximum flexure or folding. In this position, the front and rear portions 30, 32 have moved forward to positions designated by lines A" and B", respectively. The distance from line A to A" is shown as being twice the distance from line B to B". For instance, the distance from line A to A' may be 60 mm while the distance from line B to B' may be 30 mm. The greater distance of travel of the front portion 30 may be due to movement of the pivot member 76.

Movement of the head restraint assembly 16 may be disabled when the latch subsystem 80 is in the latched position. For instance, when the button 64 is released, the spring 242 may bias the third coupling member 214 into engagement with the set of teeth 166, bias the third coupling member 214 against the second coupling member 212 to actuate the second coupling member 212 against the support post 22, and bias the second coupling member 212 against the first coupling member 210 to return the button 64 and latch subsystem 80 to the latched position.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A seat assembly comprising:
   a seat back;
   a support post disposed on the seat back; and
   a headrest disposed on the support post, the headrest having a front shell, a rear shell, a traverse member that is configured to move along the support post, and a support linkage that is coupled to the front shell, rotatably disposed on the traverse member, and spaced apart from the support post;
   wherein the front shell and rear shell are configured to move in unison such that the front shell moves a greater distance than the rear shell when the headrest is moved.

2. The seat assembly of claim 1 wherein the front and rear shells move between a retracted position and an extended position such that the front and rear shells are further apart in the extended position than in the retracted position.

3. The seat assembly of claim 1 wherein the front shell includes an opening that faces toward the support post, wherein the rear shell is moveably disposed in the opening.

4. The seat assembly of claim 1 wherein the rear shell is moveably disposed on a support frame that is moveably disposed on the traverse member.

5. The seat assembly of claim 4 wherein the front shell is disposed on a pivot member that is pivotably disposed on the support frame.

6. The seat assembly of claim 5 wherein the pivot member actuates the front shell away from the rear shell as the support frame moves in a first direction.

7. The seat assembly of claim 5 wherein the pivot member actuates the front shell toward the rear shell as the front shell moves toward the support post.

8. A seat assembly comprising:
   a head restraint assembly that includes:
      a support post;
      a headrest moveably disposed on the support post, the headrest having a front shell and a rear shell that are configured to move with respect to each other;
      a traverse member disposed in the headrest that has an opening through which the support post extends; and
      a support frame moveably disposed on the traverse member, the support frame having a pair of guide arms that are disposed above the support post and that are received by the front shell for guiding movement of the front shell and a bumper that is configured to engage the support post to limit movement of the headrest, wherein the bumper is disposed between and spaced apart from the guide arms and disposed above the support post throughout a range of fore-aft movement of the support frame with respect to the traverse member.

9. The seat assembly of claim 8 wherein the bumper is disposed above the support post.

10. The seat assembly of claim 9 wherein the support frame includes a bumper tab that is shorter than the guide arms such that the bumper tab does not engage the front shell, wherein the bumper is disposed on the bumper tab.

11. The seat assembly of claim 8 wherein the traverse member includes a guide feature that is moveably disposed in a lower guide opening on the front shell for guiding movement of the front shell with respect to the traverse member.

12. The seat assembly of claim 11 wherein the guide feature has a generally T-shaped configuration.

13. The seat assembly of claim 8 wherein the support frame includes a first mounting arm that is received in a guide slot on the traverse member.

14. The seat assembly of claim 13 wherein the support frame further comprises a second mounting arm, wherein the traverse member is disposed between the first and second mounting arms.

15. The seat assembly of claim 8 wherein the traverse member includes a first stop that engages the support post to inhibit movement of the traverse member toward the support post.

16. The seat assembly of claim 8 wherein the traverse member includes a second stop that engages the support frame to inhibit movement of the support frame toward the traverse member.

17. A seat assembly comprising:
   a support post;
   a headrest moveably disposed on the support post;
   a traverse member disposed in the headrest, the traverse member including a hub and a block disposed proximate the hub; and
   a support linkage rotatably disposed on the hub, the support linkage having a mounting groove that receives the block;
   wherein the support post extends through the hub and the block helps retain the support linkage on the hub when the block is disposed in the mounting groove.

18. The seat assembly of claim 17 wherein the support linkage engages a pivot member that is disposed on a front shell of the headrest.

19. The seat assembly of claim 18 wherein the pivot member is configured to rotate with respect to the support linkage.

20. The seat assembly of claim 17 wherein the traverse member is configured to move with respect to the support post.

* * * * *